United States Patent [19]

Yamaguchi et al.

[11] Patent Number: 4,602,865
[45] Date of Patent: Jul. 29, 1986

[54] METHOD FOR SORTING OUT SLIDE FILMS IN A MAGAZINE SYSTEM

[75] Inventors: Kiyoshi Yamaguchi; Seiichi Yamazaki; Koji Ichikawa, all of Kaisei, Japan

[73] Assignee: Fuji Photo Film Co., Ltd., Kanagawa, Japan

[21] Appl. No.: 624,965

[22] Filed: Jun. 26, 1984

[30] Foreign Application Priority Data

Jun. 30, 1983 [JP] Japan ................ 58-119826

[51] Int. Cl.⁴ .................................... G03B 27/52
[52] U.S. Cl. ........................ 355/40; 355/50; 355/64
[58] Field of Search ............... 355/41, 40, 64, 50, 355/51

[56] References Cited

U.S. PATENT DOCUMENTS 3,588,243 6/1971 Osawa ........................... 355/64 X
3,922,084 11/1975 Burton et al. ................... 355/41
4,148,582 4/1979 DeRyke et al. .................. 355/64 X Primary Examiner—Richard A. Wintercorn
Attorney, Agent, or Firm—Wenderoth, Lind & Ponack

[57] ABSTRACT

A method for sorting slide films stored in a magazine. One slide film has a mount made of a rigid material such as thick paper, and an exposed film or a picture image is mounted on the mount. In a sequence of operations to take out a film slide from a magazine storing a plurality of slides, transport the same for a predetermined treatment and transport again to another place for storing the same in a different magazine or a bucket, a dummy slide which can be easily discerned is inserted for every group of slides sorted according to an arbitrary classification, for example by clients or by subjects, to thereby facilitate a sorting operation.

1 Claim, 5 Drawing Figures

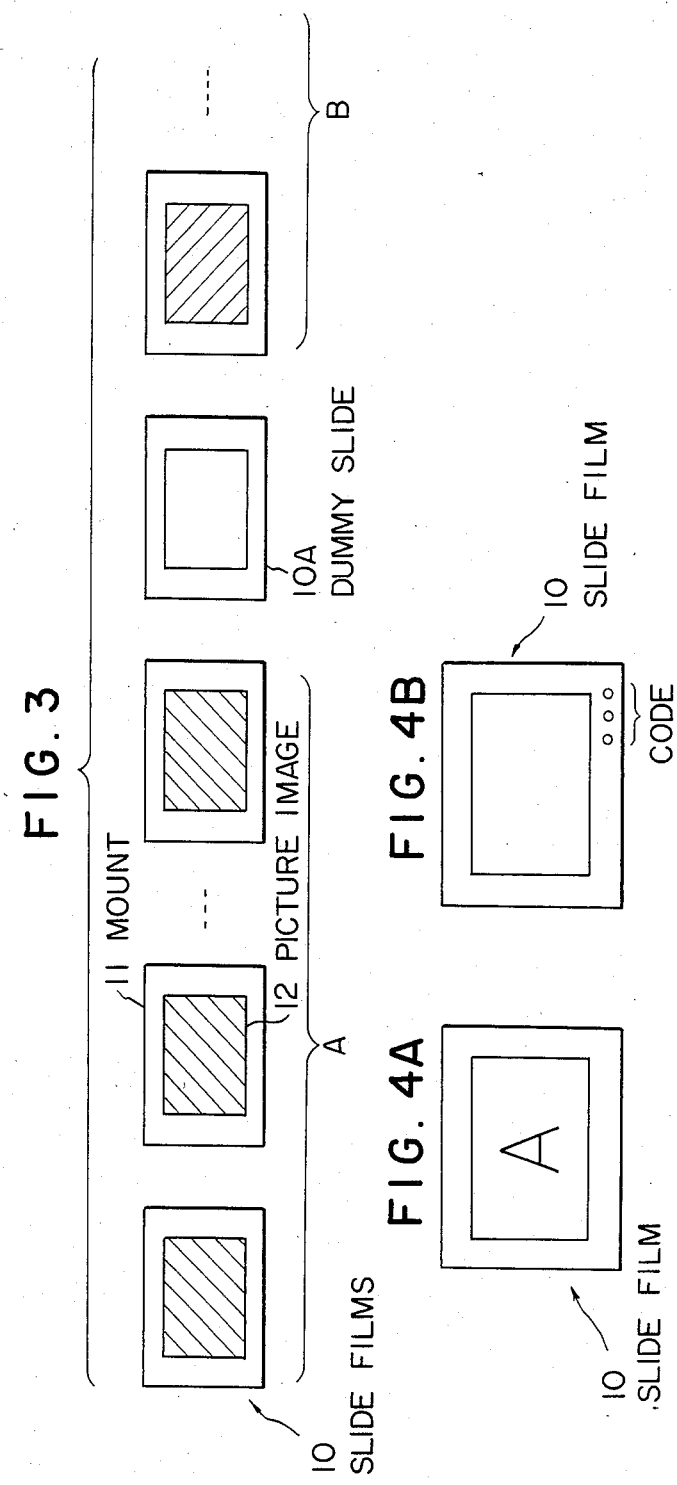

METHOD FOR SORTING OUT SLIDE FILMS IN A MAGAZINE SYSTEM

BACKGROUND OF THE INVENTION

The present invention relates to a method for sorting film slides, mounted and housed on each frame of a mount, by distributing them in a magazine according to same classification.

Construction of the magazine 1 may comprise, for example as shown in FIG. 1, upper and bottom disks 2 and 3 which are arranged in parallel with each other and combined with some square frame structures 5. The frame structures 5 have respectively a plurality of partitions 12 arranged stepwise to form a housing for storing film slides, and each partition stores one of the slides. Slides to be stored in the magazine 1 are preferably sorted according to classification to facilitate the subsequent operations such as projecting them on a screen or making a copy of the same. In that manner confusion may be avoided, which is otherwise likely to occur. The magazine 1 is rotated by a drive means (not shown) such as a motor so that slides may be placed in or taken out of the housing at a given position.

SUMMARY OF THE INVENTION

An object of the present invention is therefore to provide a method for sorting out film slides stored in a magazine according to classification by inserting a dummy slide to mark off one sorted group of slide from another.

Accordingly, there is provided a method for sorting out slide films in a magazine system of the type comprising the steps of taking out a slide from a magazine which stores a plurality of slides, transporting the slides, treating the same according to a predetermined process, and transporting and placing another magazine or a bucket, the method being characterized in that a dummy slide which is easily distinguished from other slides is inserted between one group of the slides and another to thereby facilitate sorting out the slides according to classification.

The nature, principle and utility of the invention will become more apparent from the following detailed description when read in conjunction with the accompanying drawings.

BRIEF DESCRIPTION OF THE DRAWING

In the accompanying drawings:

FIG. 3 is a diagram showing one example of film slides to which the present invention is applied; and FIGS. 4A and 4B are views showing other examples of dummy slides to which the present invention is applied.

DETAILED DESCRIPTION OF THE PREFERRED EMBODIMENTS

The present invention will now be described in more detail.

Figure 1:
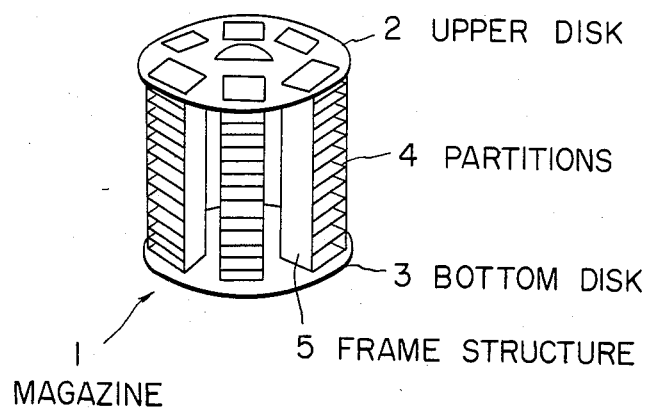
FIG. 1 is a view showing the appearance of one embodiment of a magazine.

The present invention relates to a method for sorting film slides stored in a magazine such as shown in FIG. 1. One slide 10 has a mount 11 made of the rigid material such as thick paper, and a developed (exposed) film or a picture image 12 is mounted on the mount 11 as shown in FIG. 3. In a sequence of operations to take out a slide from a magazine storing a plurality of slides, transport the same for a predetermined treatment and transport again to another place for storing the same in a different magazine or a bucket, a dummy slide which can be easily discerned is inserted for every group of film slides films sorted according to an arbitrary classification, for example by clients or by subjects, to thereby facilitate the sorting operation.

Figure 2:
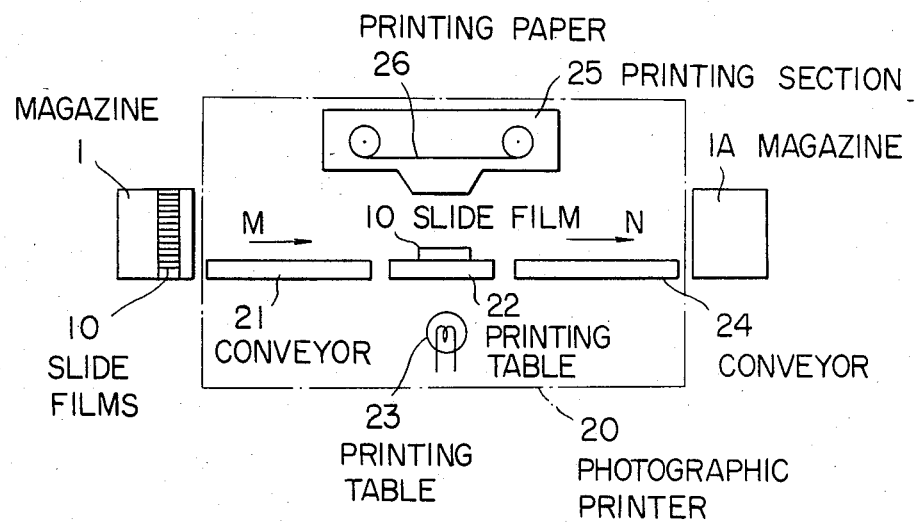
FIG. 2 is a schematic view showing one example of apparatus to which the method of the present invention is applicable.

FIG. 2 shows an embodiment of a photographic processing apparatus to which the present invention is applied. A plurality of film slides 10 are stored in alignment in a magazine 1 with dummy slides inserted between different groups. The dummy slides (10A) are made easily distinguishable from other slides by having no images therein, for instance, as shown in FIG. 3. In summation, slides 10 stored in the magazine 1 are marked off by class as well as with a dummy slide 10A inserted for different groups A and B. The magazine 1 may be mounted on a photographic printer 20. The printer 20 takes slide 10 out of the magazine 1 according to the successive order for printing, conducts the print process, and places back the slide 10 into a different magazine 1A but in the same order. The printer 20 may comprise a conveyor 21 which takes out a slide 10 from a magazine 1 and transports the same in the direction M, a printing section 25 which prints the picture image 12 on the slide 10 onto a rolled printing paper 26, a printing table 22 which fixes the position of the slide 10 for focusing the same at the time of printing, a light source 23 provided under the printing table 22 and a conveyor 24 which transports the processed slide film 10 in the direction N and supplies the slide 10 to the magazine 1A.

In the apparatus of the above construction, the slides 10 which are classified by clients for example, are taken out from magazine 1 one by one according to the order and are transported to the printing table 22 via the conveyor 21. The taken out slide 10 is aligned at a suitable position laterally as well as horizontally on the printing table 22, and when the table 22 is moved vertically so as to receive the light from the light source 23, the picture image 12 on the slide 10 is focused on the printing paper 26, and a suitable amount of exposure is determined by an exposure control circuit (not shown) for printing. When the printing paper 26 is printed, upon the processed slide 10 on the table 22 is carried by the conveyor 24 and stored in the magazine 1A. This series of processing operations is carried for all the slide films 10 stored in the magazine 1 consecutively. If a dummy slide 10A as shown in FIG. 3 is transported onto the printing table 22, the slide is recognized by monitoring the same on a screen which is incorporated in the printing section 25, whereby an operator can easily discriminate the successive slide films from the preceding ones according to the inserted dummy slide 10A and decide that the former is for a client different from that of the latter. The classification of slides 10 is not limited to by clients but may naturally be by subjects, number of the frames or any other classification necessary.

As the dummy slide inserted between one class and another is passed through the same processing steps as other slides 10, it is simple to judge the marking off between groups to facilitate the sorting operation of printed paper as well as slides 10 stored in the magazine 1A. When exposure the amount of is determined suitably by the printing section 25, the dummy slide 10A can be easily recognized. It may therefore be possible that when the dummy slide 10A is detected by the printing section 25, one group of slides 10 may be placed in a bucket which replaces the magazine 1A at the right-hand side of the conveyor 24 according to the information. The bucket may be changed for each new group.

Although slides are subjected to printing process in the foregoing description, it may be by no means limited to that alone. The present invention with use of a dummy slide is applicable effectively as well to a series of processing steps of taking out of slides from a magazine, transporting, printing, projecting, transporting and storing or classifying of slides in a magazine or a bucket. As a dummy slide, any arbitrary slide may be used so far as it is distinguishable from ordinary slide films. It may be differentiated from others by color, symbol, character, etc. which are photographed on a picture image as shown in FIG. 4A. If the film or the mount on which a film is fixed is printed with coded diagrams, symbols or characters as shown in FIG. 4B, slides may be automatically sorted out by classification by reading out such codes with O.C.R. (Optical Character Recognition) and so on.

What is claimed is:

1. A method of sorting exposed film slides of identical size into groups according to a predetermined classification, comprising the steps of:

storing unattached exposed film slides in groups in a magazine;

storing imageless slides of the same size as the exposed film slides in the magazine between adjacent ones of the groups, successively transporting the exposed film slides and imageless slides from the magazine, processing the exposed film slides and transporting the exposed film slides to another magazine or a container, and shining a light through the slides so as to distinguish the imageless slides from the exposed film slides and sorting the slides into the groups separated by the imageless slides during the step of transporting the exposed film slides to another magazine or a container.

* * * * *